(12) United States Patent
Imanishi

(10) Patent No.: US 8,842,980 B2
(45) Date of Patent: Sep. 23, 2014

(54) IMAGING DEVICE AND IMAGING METHOD

(71) Applicant: FUJIFILM Corporation, Tokyo (JP)

(72) Inventor: Kazutaka Imanishi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/163,788

(22) Filed: Jan. 24, 2014

(65) Prior Publication Data

US 2014/0140684 A1    May 22, 2014

Related U.S. Application Data

(63) Continuation of application No. PCT/JP2012/065327, filed on Jun. 15, 2012.

(30) Foreign Application Priority Data

Aug. 9, 2011    (JP) .................................. 2011-174165

(51) Int. Cl.
  *G03B 17/00*    (2006.01)
  *G02B 27/64*    (2006.01)

(52) U.S. Cl.
  CPC .................................... *G02B 27/646* (2013.01)
  USPC ......................................... 396/55; 348/208.4

(58) Field of Classification Search
  USPC ............................. 396/55; 348/208.4, 208.99
  See application file for complete search history.

(56) References Cited

U.S. PATENT DOCUMENTS

| | | |
|---|---|---|
| 2009/0033767 A1 | 2/2009 | Fujiyama |
| 2010/0091120 A1* | 4/2010 | Nagata et al. ............. 348/208.4 |
| 2010/0150537 A1* | 6/2010 | Tsuchihashi .................. 396/55 |
| 2010/0254688 A1* | 10/2010 | Masuda ........................ 396/55 |
| 2013/0093905 A1* | 4/2013 | Saitsu ....................... 348/208.4 |

FOREIGN PATENT DOCUMENTS

| | | |
|---|---|---|
| JP | 2000-101895 A | 4/2000 |
| JP | 3928222 B2 | 6/2007 |
| JP | 4135046 B2 | 8/2008 |
| JP | 2009-38442 A | 2/2009 |
| JP | 2009-232275 A | 10/2009 |
| JP | 2011-39295 A | 2/2011 |

* cited by examiner

*Primary Examiner* — Clayton E Laballe
*Assistant Examiner* — Linda B Smith
(74) *Attorney, Agent, or Firm* — Birch, Stewart, Kolasch & Birch, LLP

(57) ABSTRACT

An imaging device comprising: an imaging device; a blur detection unit; a correction operation unit; a blur correction position calculation unit; a driving unit; a centripetal force addition unit for adding a centripetal force that returns the correction operation unit to a center of the range of movement; and a swing correction mode execution unit for executing image blur correction control of a swing correction mode that suppresses an image blur in a state where the centripetal force addition unit adds a centripetal force of a predetermined level to the correction operation unit in an exposure period in which the imaging element is exposed, and returns the correction operation unit to the center of the range of movement by adding a centripetal force greater than the centripetal force in the exposure period to the correction operation unit in a non-exposure period in which the imaging element is not exposed.

20 Claims, 10 Drawing Sheets

IMAGING DEVICE AND IMAGING METHOD

CROSS REFERENCE TO RELATED APPLICATIONS

This non-provisional application is a Continuation of International Application No. PCT/JP2012/065327 filed on Jun. 15, 2012, which claims the benefit of Japanese Patent Application No. 2011-174165 filed in Japan on Aug. 9, 2011. The entire contents of all of the above applications are hereby incorporated by reference.

BACKGROUND OF THE INVENTION

1. Field of the Invention

The present invention relates to an imaging device and an imaging method, and specifically, to an imaging device having an image blur correction mode suitable for the case of continuously taking images of multiple frames while rotating the imaging device in one direction (swing movement) in a panoramic imaging mode or the like, and an imaging method thereof.

2. Description of the Related Art

In an imaging device such as a digital camera, there is known a panoramic imaging mode that: continuously takes images of multiple frames while rotating the camera (swing movements such as panning and tilting); combines them by performing predetermined operation processing on parts in which the angles of views of the multiple taken images of multiple frames overlap with each other; and generates one panoramic image (see PTL 1 to PTL 5).

Moreover, in PTL 3 to PTL 5, there is suggested that image blur correction is performed so as not to cause the rotation blur (image blur) even if the camera is not stopped at the time of taking the image of each frame (exposure) in the imaging in a panoramic imaging mode (panoramic imaging).

According to PTL 3, the rotation blur is suppressed by displacing the position of the imaging area of an imaging element at the exposure time of each frame and suppressing the position change between the imaging area and a subject image formed on the imaging area. Moreover, by displacing the imaging area to the position of the subject image turned by a predetermined rotation angle in a non-exposure period, a state is provided where it is possible to suppress the rotation blur in the next exposure period.

According to PTL 4 and PTL 5, unlike PTL 3 in which the position of the imaging area is changed as a correction operation unit displaced to suppress the rotation blur, the rotation blur is suppressed by moving the optical axis of an optical system that forms a subject image in an opposite direction to the rotation direction of the camera to suppress the position change in the imaging area and the subject image. Moreover, similar to PTL 3, a state is provided where it is possible to suppress the rotation blur in the next exposure period by returning the optical axis of the optical system to the center of a range of movement (correction center) or over the position in a non-exposure period.

Also, in the present specification, as for an image blur correction mode that tries not to cause the image blur (rotation blur) due to the swing movement of a camera at the time of continuously taking images of multiple frames while causing the camera to perform the swing movement in one direction like the panoramic imaging mode, it is referred to as "swing correction mode."

Also, generally, the centripetal force (a signal corresponding to the centripetal force) that returns a correction operation unit to the correction center is added to a control signal (target position signal) that controls the position of the correction operation unit to prevent image blur correction from not being appropriately performed when the correction operation unit reaches the edge position of a predetermined range of movement and the correction operation is restricted, in control of the correction operation unit that performs operation within the range of movement to suppress the image blur (see PTL 6).

PTL 1: Japanese Patent Application Laid-Open No. 2000-101895
PTL 2: Japanese Patent Application Laid-Open No. 2009-232275
PTL 3: Japanese Patent Application Laid-Open No. 2009-38442
PTL 4: Japanese Patent No. 4135046
PTL 5: Japanese Patent No. 3928222
PTL 6: Japanese Patent Application Laid-Open No. 2011-39295

SUMMARY OF THE INVENTION

Incidentally, in the case of continuously taking images of multiple frames while causing a camera to perform a swing movement in one direction like panoramic imaging in a panoramic imaging mode, it is desirable to take an image without image blur even if the swing movement is fast, because the failure of imaging due to a too fast swing movement is reduced and a photographer's burden of moderating the speed of the swing movement so as not to exceed the upper limit speed of the swing movement is mitigated.

The image blur correction in the swing correction mode as suggested in PTL 3 to PTL 5 enables: execution of the imaging of images without image blur without stopping the swing movement; execution of the imaging of images without image blur even if the swing movement is fast as long as the correction operation unit in the exposure period is displaced within a range of movement and the image blur correction is performed at the operation speed within the speed that can be controlled; and the imaging at the high-speed swing movement.

Meanwhile, in the image blur correction in the swing correction mode, it is necessary to return the correction operation unit to a desired exposure start position such as the correction center in a shorter period than the non-exposure period. The non-exposure period becomes shorter as the imaging interval to image each frame becomes shorter, and the time to return the correction operation unit to the exposure start position in the non-exposure period becomes longer as the displacement amount of the correction operation unit in the exposure period becomes larger. Therefore, when the imaging interval is short or the displacement amount of the correction operation unit in the exposure period is large, there is fear that it is not possible to return the correction operation unit to the exposure start position in the non-exposure period and appropriately suppress rotation blur.

For example, in the case of taking an image (exposure) of one frame whenever a camera rotates by a constant angle in a panoramic imaging mode, the imaging interval becomes shorter as the swing movement becomes faster. Moreover, in the case of taking an image every predetermined time in the panoramic imaging mode, the displacement amount of the correction operation unit in the exposure period becomes larger as the swing movement becomes faster. Therefore, there is fear that it is not possible to appropriately suppress the rotation blur when the swing movement is fast. Moreover, even in a case where the photographer wants to take an image without image blur while causing the camera to perform the swing movement in one direction in a continuous imaging mode or the like, similarly, there is fear that it is not possible to appropriately suppress the rotation blur when the swing movement is fast.

Therefore, it is important to return the correction operation unit to the exposure start position as promptly as possible in the non-exposure period to enable imaging in a higher-speed swing movement.

By contrast with this, PTL 1 to PTL 6 do not suggest intending the speed-up of control at the time of returning the correction operation unit to the exposure start position in the non-exposure period.

Moreover, a general imaging device includes a normal still image imaging mode to take a still image of one frame every time a release button is fully pressed, in addition to the panoramic imaging mode. The swing correction mode is used for switching with a normal image blur correction mode (standard correction mode) suitable for the still image imaging mode. In the image blur correction in the standard correction mode, it is desirable to provide means for adding the centripetal force that returns the correction operation unit to the correction center like PTL 6, and, in this case, if the correction operation unit is returned to the exposure start position by the use of the centripetal force even in the image blur correction in the swing correction mode, it is suitable because it is not necessary to add special means for the swing correction mode. However, PTL 1 to 6 do not suggest returning the correction operation unit to the exposure start position in the non-exposure period by the use of such centripetal force, in the image blur correction in the swing correction mode. Moreover, in the image blur correction in the standard correction mode, the centripetal force is added to the extent that the performance of the image blur correction is not degraded. Therefore, even if the centripetal force is used for the image blur correction in the swing correction mode, since the correction operation unit cannot be returned to the exposure start position as it is, it is necessary to return it promptly.

Further, in PTL 3 and PTL 5 among PTL 3 to PTL 5 that contain description related to the swing correction mode, the correction operation unit (the imaging area of an imaging element) is returned to a position over the correction center instead of the correction center as the exposure start position in the non-exposure period, a camera rotation angle range that can suppress the rotation blur is increased, and control is not performed to displace the correction operation unit from the correction center in the exposure period. Normally, since the optical system acquires an image of the best image quality in a state where the correction operation unit is set to the correction center, in the case of PTL 3 and PTL 5, there is a problem that the image resolution decreases and the influence of the aberration of the optical system increases. Moreover, since the displacement amount to return the correction operation unit to the exposure start position in the non-exposure period is also large, the displacement amount level causes a negative effect like a case where imaging in a higher-speed swing movement is enabled.

In PTL 4, when the exposure period is over, the correction operation unit is returned to the correction center by resetting an integration circuit that outputs a target position signal to move the correction operation unit. However, at the time of resetting the integration circuit, since the value of the target position signal output from the integration circuit discontinuously changes, there is a problem that the operation of the correction operation unit becomes unstable and a bad influence is given to the operation in the exposure period.

The present invention is made taking into account such conditions, and it is an object to provide an imaging device and method that can take images in which image blur (rotation blur) due to a swing movement is suppressed in a case where images (still images) of multiple frames are continuously taken while causing the imaging device to perform the swing movement in one direction like a panoramic imaging mode, and that enable a higher-speed swing movement as compared with the related art.

To achieve this object, an imaging device according to the present invention includes: an imaging device including an imaging element and an optical system that forms a subject image on an imaging area of the imaging element; a blur detection unit for outputting a blur signal indicating a change in a position or posture by movement of the imaging device; a correction operation unit for changing a relative position between the imaging area and the subject image in a direction orthogonal to an optical axis of the optical system by operating within a predetermined range of movement; a blur correction position calculation unit for calculating a position of the correction operation unit to cancel an image blur of the subject image based on the blur signal output from the blur detection unit, as a blur correction position; a driving unit for driving the correction operation unit based on the blur correction position calculated by the blur correction position calculation unit; a centripetal force addition unit for adding a centripetal force that returns the correction operation unit to a center of the range of movement; and a swing correction mode execution unit for executing image blur correction control of a swing correction mode that suppresses an image blur due to the change in the position or posture by the movement of the imaging device by driving the correction operation unit by the driving unit in a state where the centripetal force addition unit adds a centripetal force of a predetermined level to the correction operation unit in an exposure period in which the imaging element is exposed, and returns the correction operation unit to the center of the range of movement by adding a centripetal force greater than the centripetal force in the exposure period to the correction operation unit by the centripetal force addition unit in a non-exposure period in which the imaging element is not exposed.

According to the present invention, using the centripetal force that prevents the correction operation unit from reaching the end position in the range of movement and entering a state where the correction operation is restricted, it is possible to return the correction operation unit to the center of the range of movement in the non-exposure period of the swing correction mode, and, by making the centripetal force greater than that in the exposure period, it is possible to promptly return the correction operation unit to the correction center. Therefore, by performing image blur correction control of the swing correction mode in the case of taking images of multiple frames continuously while performing swing movement of the imaging device in one direction like a panoramic imaging mode, it is possible to suppress an image blur (rotation blur) in the exposure period due to the swing movement by driving the correction operation unit, and it is possible to take an image in a higher-speed swing movement. Moreover, since the correction operation unit is returned to the center of the range of movement using the centripetal force, the operation is more stable than a case where the correction operation unit is returned to the center of the range of movement by a separated control signal, and it is possible to suitably start image blur correction in the exposure period. Further, since the correction operation unit starts from the center of the range of movement when the exposure is started, an image of the best image quality is acquired.

In the present invention, it is desirable that the centripetal force addition unit adds the centripetal force to the correction operation unit by using a position in which a displacement amount by the centripetal force is subtracted from the blur correction position calculated by the blur correction position calculation unit, as a position of the correction operation unit driven by the driving unit. In the present form, the centripetal force is added to the correction operation unit on the control processing.

In the present invention, it is desirable that the swing correction mode execution unit causes the blur correction position calculation unit to calculate the blur correction position, using the blur signal output from the blur detection unit as a zero value in the non-exposure period. The present form shows one form in a case where the image blur correction control is substantially stopped when the correction operation unit is returned to the correction center in the non-exposure period in the swing correction mode.

In the present invention, it is desirable to include: a standard correction mode execution unit for executing image blur correction control of a standard correction mode that suppresses an image blur due to the change in the position or posture by the movement of the imaging device by driving the correction operation unit by the driving unit in a state where the centripetal force addition unit adds a centripetal force of a predetermined level to the correction operation unit regardless of the exposure period or the non-exposure period; and an image blur correction control switching unit for switching image blur correction control to be executed, between the image blur correction control of the standard correction mode by the standard correction mode execution unit and the image blur correction control of the swing correction mode by the swing correction mode execution unit. The present form includes a suitable standard correction mode in a normal still image imaging mode besides the swing correction mode as an image blur correction mode, and shows a form in which image blur correction by these modes is switched and performed. In this case, it is desirable that the swing correction mode execution unit sets the centripetal force added to the correction operation unit by the centripetal force addition unit in the non-exposure period to a centripetal force greater than at least the centripetal force at the time of the standard correction mode.

In the present invention, it is desirable that: the imaging device has a normal still image imaging mode to take a still image of one frame and a panoramic imaging mode to take still images of multiple frames continuously while performing a swing movement of the imaging device; when the still image imaging mode is selected, the image blur correction control switching unit sets image blur correction control to be executed to the image blur correction control of the standard correction mode by the standard correction mode execution unit; and when the panoramic imaging mode is selected, the image blur correction control to be executed is set to the image blur correction control of the swing correction mode by the swing correction mode execution unit. In this form, an image blur correction mode suitable to an imaging mode selected by the user is automatically selected and executed.

As another form for this, there is a possible form to include a correction mode selection unit for selecting the standard correction mode and the swing correction mode by the user, where: when the standard correction mode is selected by the correction mode selection unit, the image blur correction control switching unit sets image blur correction control to be executed to the image blur correction control of the standard correction mode by the standard correction mode execution unit; and when the swing correction mode is selected by the correction mode selection unit, the image blur correction control to be executed is set to the image blur correction control of the swing correction mode by the swing correction mode execution unit. That is, the user may select a desired image blur correction mode. For example, in a case where a continuous imaging mode is selected as an imaging mode, when the user plans to take images continuously while performing swing movement of the imaging device in one direction, it is suitable to select the swing correction mode. If an image is taken in the same way as normal still image imaging, it is suitable to select the standard correction mode.

In the present invention, it is desirable that the imaging device includes pan/tilt detection unit for detecting whether the imaging device performs a panning operation or the imaging device performs a tilting operation, where, when the pan/tilt detection unit detects that the imaging device performs the panning operation or the tilting operation, the standard correction mode execution unit stops the image blur correction control of the standard correction mode and the swing correction mode execution unit invalidates the detection by the pan/tilt detection unit. This is because, in the present form, in a case where the image blur correction control of the swing correction mode is executed in the panoramic imaging mode or the like, the swing movement is determined as the panning operation or the tilting operation and the image blur correction control is stopped.

In the present invention, it is desirable that the blur detection unit includes a high-pass filter to pass a signal of a frequency component on a high-pass side as compared with a predetermined cutoff frequency in a blur signal output from a sensor; and at a time of the image blur correction control of the standard correction mode by the standard correction mode execution unit, the image blur correction control switching unit effectively uses the high-pass filter, and, at a time of the image blur correction control of the swing correction mode by the swing correction mode execution unit, the image blur correction control switching unit invalidates the high-pass filter. This is because, in the present form, in a case where the image blur correction control of the swing correction mode is performed in the panoramic imaging mode or the like, a signal of the low frequency component that originates in the swing movement in the blur signal output from the sensor is not removed by the high-pass filter. When the signal of the low frequency component that originates in the swing movement is removed from the blur signal, it is not possible to appropriately suppress the rotation blur due to the swing movement.

In the present invention, it is desirable that: at a time of the image blur correction control of the standard correction mode by the standard correction mode execution unit, the image blur correction control switching unit sets the range of movement of the correction operation unit to a normal range narrower than a maximum range of movement restricted by a mechanical end position; and at a time of the image blur correction control of the swing correction mode by the swing correction mode execution unit, the range of movement of the correction operation unit is set to an expansion range larger than the normal range.

In the present form, it is possible to expand a rotation angle range of the imaging device that can correct the rotation blur in the exposure period in the swing correction mode, and fasten the speed of the swing movement in the case of taking an image every constant time in the panoramic imaging mode or the like. It is possible to set the expansion range to the maximum range of movement, that is, a range of movement restricted by the end position that is mechanically controlled.

According to the present invention, it is possible to take images in which image blur (rotation blur) due to a swing movement is suppressed in a case where images of multiple frames are continuously taken while causing an imaging device to perform the swing movement in one direction like a panoramic imaging mode, and enable a higher-speed swing movement as compared with the related art.

DETAILED DESCRIPTION OF THE PREFERRED EMBODIMENTS

In the following, preferable embodiments of the present invention are described in detail with reference to the accompanying drawings.

Figure 1:
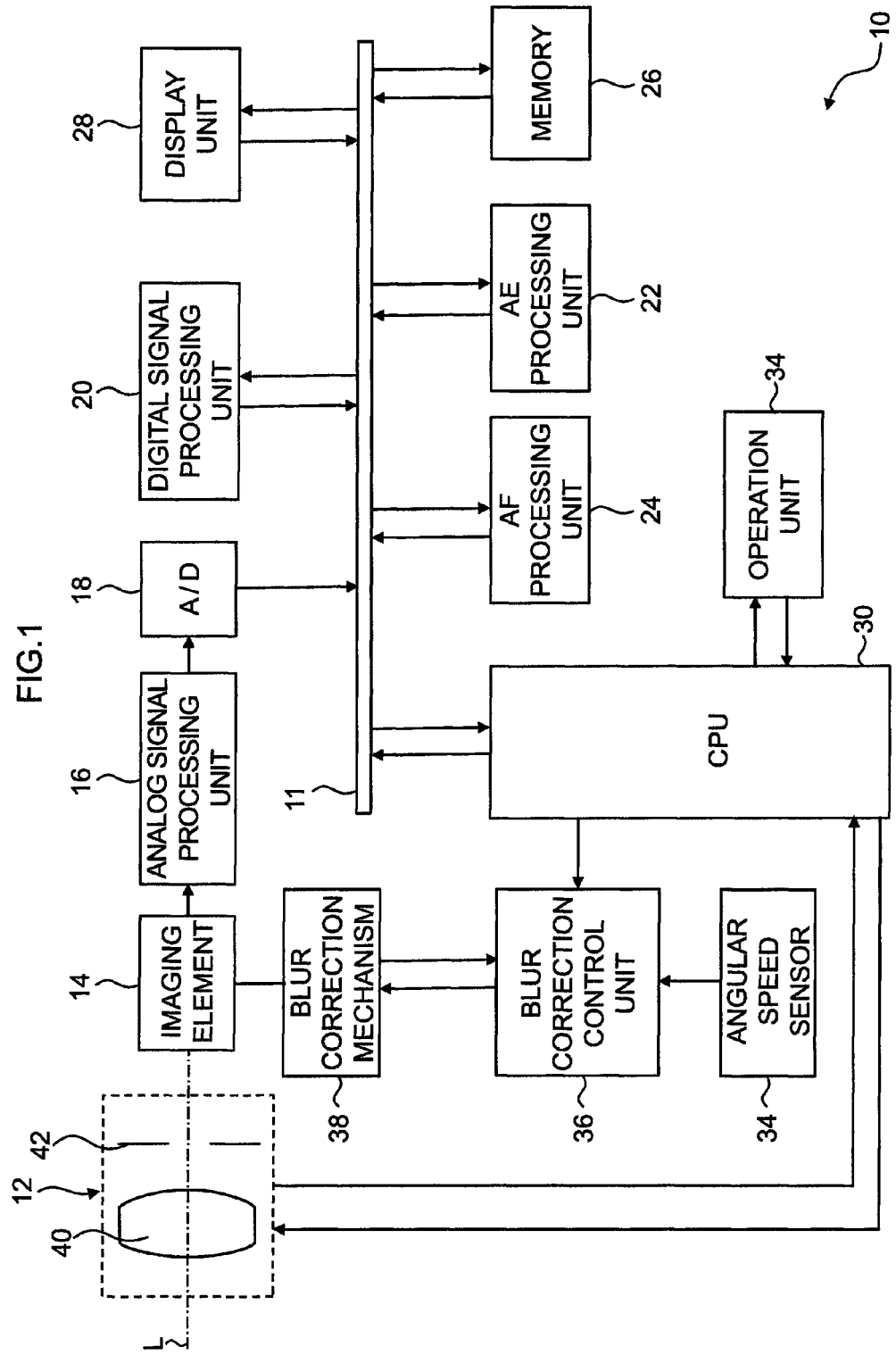
FIG. 1 is a block diagram illustrating the overall structure of a digital camera to which the present invention is applied.

As illustrated in FIG. 1, a digital camera 10 includes an imaging lens 12, an imaging element 14, an analog signal processing unit 16, a digital signal processing unit 20, an AE processing unit 22, an AF processing unit 24, a memory 26, a display unit 28, a CPU 30, an operation unit 32, an angular speed sensor 34 and a blur correction control unit 36.

The imaging lens 12 includes a plurality of lenses illustrated as a lens 40 in the figure where a component of an optical system such as a diaphragm 42 is held in the lens barrel, such that object light entered from the front side (object side) of the imaging lens 12 passes through the inside of the imaging lens 12 (optical system) and thereby an image of the object (subject image) is formed on an imaging area of the imaging element 14. Although the configuration of the imaging lens 12 is known and therefore its detailed explanation is omitted, the lens 40 including the plurality of lenses includes a lens for focus adjustment and a lens for focal length adjustment (for zoom adjustment) that are installed so as to be movable along optical axis L. The focus adjustment and the zoom adjustment are performed by moving those lenses and adjusting the position in the direction of optical axis L. Moreover, the exposure amount adjustment is performed by adjusting the aperture amount of the diaphragm 42. Further, the lens for focus adjustment, the lens for zoom adjustment and the diaphragm 42 are driven by motors (not illustrated) respectively, and each motor is controlled according to a control signal given from the CPU 30 to a driver for motor control (not illustrated).

The imaging element 14 denotes, for example, a solid imaging element such as CCD, where an imaging area thereof (not illustrated) is arranged so as to be vertical to optical axis L on the rear side of an imaging lens 12 and the subject image formed by the imaging lens 12 is subjected to light in the imaging area. A plurality of pixels are arranged on the imaging area in a matrix manner, and an image of the subject image formed on the imaging area by performing photoelectric conversion in each pixel is output from the imaging element 14 as an analog imaging signal. Moreover, the imaging element 14 is installed on a blur correction mechanism 38, supported so as to be movable within a predetermined range in a surface vertical to optical axis L, and, as described later, moves so as to suppress an image blur due to the change in the position or posture by the movement of the digital camera 10 such as camera shake.

An analog signal processing unit 16 applies predetermined analog signal processing such as correlation double sampling processing and amplification processing to the imaging signal input from the imaging element 14. The imaging signal processed by this analog signal processing unit 16 is converted into digital image data by an A/D converter 18 and subsequently input in the digital signal processing unit 20 through a system bus 11.

The digital signal processing unit 20 performs predetermined digital processing such as processing related to image quality correction including gray level correction, γ correction and white balance correction, and compression/decompression processing that performs compression into image data of a predetermined compression format (such as JPEG) or decompresses the compressed image data, on the digital image data.

The AE processing unit 22 imports the image data which is imported from the imaging element 14 when a release button is pressed halfway and which is subjected to predetermined signal processing by the analog signal processing unit 16 and the digital signal processing unit 20, through the system bus 11, and detects an exposure amount suitable for imaging on the basis of the imported image data. The exposure amount detected by this AE processing unit 22 is given to the CPU 30, and, by photometry processing by the CPU 30, the electronic shutter speed (length of exposure time) of the imaging element 14 and the aperture amount of the diaphragm 42 are adjusted so as to provide an appropriate exposure amount.

The AF processing unit 24 imports the image data which is imported from the imaging element 14 when the release button is pressed halfway and which is subjected to signal processing by the analog signal processing unit 16 and the digital signal processing unit 20, through the system bus 11, and detects a focus evaluation value indicating the degree of focus (degree of contrast) on the basis of the imported image data. For example, a high-frequency component is extracted from a predetermined AF sensing region in the image data and a multiplied value is detected as a focus evaluation value. The focus evaluation value detected by the AF processing unit 24 is given to the CPU 30 through the system bus 11, and, by ranging processing by the CPU 30, the lens for focus adjustment (focusing lens) in the imaging lens 12 is moved on optical axis L and set to the position in which the contrast in the AF sensing region is maximum.

The memory 26 denotes a cache memory that temporarily stores image data when the digital signal processing unit 20 performs various kinds of image processing. Moreover, a VRAM region is secured in the memory 26 and a through image is buffered. Here, although illustration is omitted, a storage device that stores data of a program to control the digital camera 10 or the like and a storage device such as a memory card that stores a taken image are installed separately from the memory 26.

The display unit 28 denotes a display installed on the back of the digital camera 10. An image with a small number of pixels taken before taking a still image is displayed as a through image in the display unit 28, and it functions as a finder. Moreover, the display unit 28 displays an image stored in the storage device such as the memory card, and guide images such as an operation menu and a setting menu.

The CPU 30 integrally controls the operation of the digital camera 10. For example, the CPU 30 controls the operation mode of the imaging element 14 such as the electronic shutter speed, and automatically performs focus adjustment and exposure amount adjustment according to the half press operation of the release button. Moreover, the CPU 30 performs control related to the operation of the blur correction control unit 36 described below and the like.

The operation unit 32 includes various operation members installed in a digital camera chassis such as a power supply button, a release button, a menu button and a function key, where the operation state of those operation members can be read by the CPU 30. The release button can perform two-staged operation of a half press and full press. When the release button is pressed halfway, the detection of an exposure amount by the AE processing unit 22 and the calculation of the focus evaluation value by the AF processing unit 24 are performed, and the focus adjustment and the exposure adjustment are automatically performed. Moreover, a setting input or setting change of the digital camera 10 is performed by operating the menu button or the function key.

The angular speed sensor 34 denotes a blur detection sensor installed in a predetermined position of the digital camera 10 to detect the change (position change) in the posture of the digital camera 10, and, for example, a gyroscopic sensor is used.

When the position of the digital camera 10 is changed by the movement of the hands and arms that hold the digital camera 10 and the like, the change is detected as an angular speed by the angular speed sensor 34 and an angular speed signal indicating the angular speed is output to the blur correction control unit 36.

As described later in detail, the blur correction control unit 36 drives the blur correction mechanism 38 so as to suppress an image blur due to the position change (change in the position or posture) of the digital camera 10 on the basis of the angular speed signal input from the angular speed sensor 34.

The blur correction mechanism 38 denotes a mechanism that supports the imaging element 14 so as to be movable in a direction orthogonal to optical axis L and that displaces the position of the imaging element 14 in the direction by an actuator as described above, displaces the imaging element 14 by operating the actuator according to a drive signal given from the blur correction mechanism 38 and causes the position of the imaging area of the imaging element 14 to shift in the direction orthogonal to optical axis L.

Figure 2:
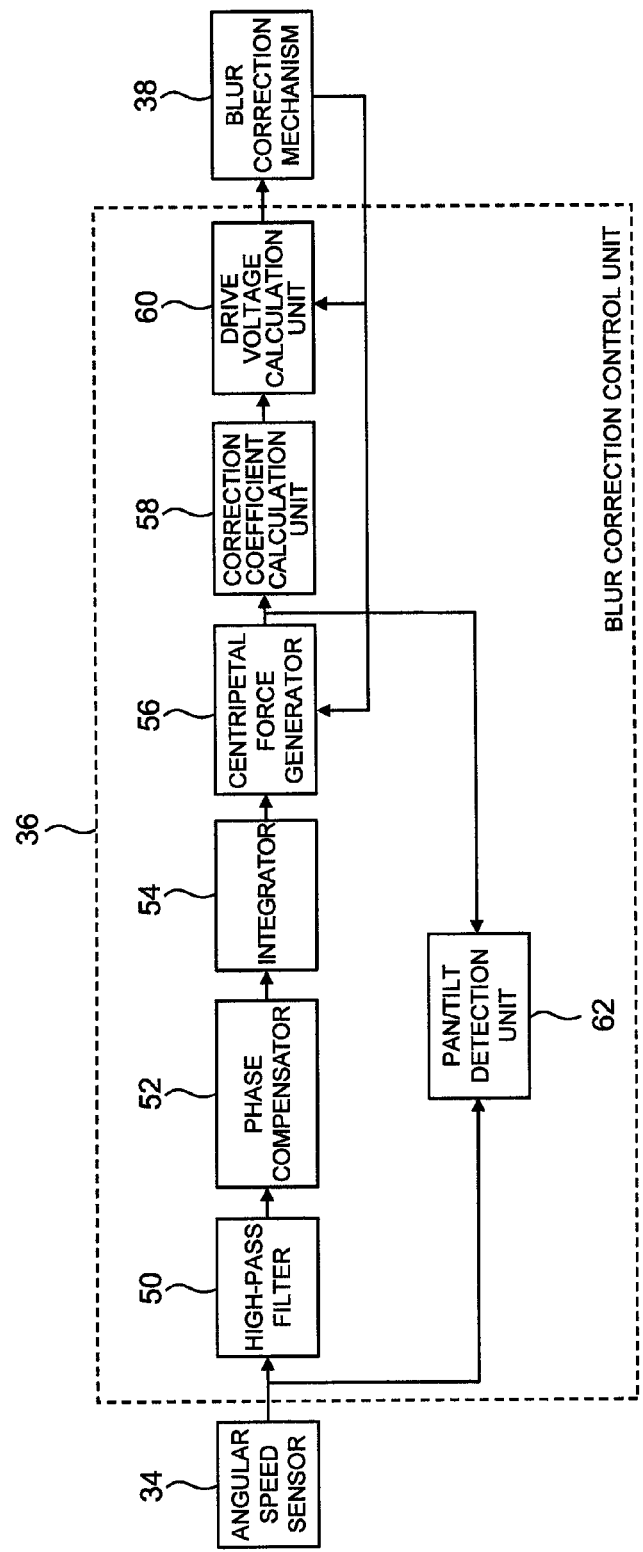
FIG. 2 is a block diagram illustrating a structure of an image blur correction mechanism.

FIG. 2 is a block diagram specifically exemplifying the configuration of an image blur correction mechanism including the angular speed sensor 34, the blur correction control unit 36 and the blur correction mechanism 38 described above.

As illustrated in the figure, the blur correction control unit 36 includes a high-pass filter (HPF) 50, a phase compensator 52, an integrator 54, a centripetal force generator 56, a correction coefficient calculation unit 58, a drive voltage calculation unit 60 and a pan/tilt detection unit 62 as shown in the image blur correction mechanism.

The angular speed sensor 34 includes two blur detection sensors that detect the position change related to each of the horizontal and vertical directions of the digital camera 10 as an angular speed, and an angular speed signal indicating the angular speed related to each direction of the horizontal and vertical directions is output from this angular speed sensor 34 and input in the blur correction control unit 36. Here, since similar processing is performed on the position change in the horizontal and vertical directions of the digital camera 10 to thereby perform image blur correction, in the following, an explanation is given to only image blur correction in the horizontal direction assuming the angular speed sensor 34 as a blur detection sensor that detects the position change in the horizontal direction of the digital camera 10, and specific explanation of image blur correction related to image blur correction in the vertical direction is omitted.

First, the angular speed signal input from the angular speed sensor 34 into the blur correction control unit 36 is input in the high-pass filter 50.

In the high-pass filter 50, only a signal of a frequency component higher than a predetermined threshold (cutoff frequency) passes among the frequency components of the angular speed signal, and a signal of a low frequency component (such as a drift component) close to a substantial direct current that is not the target of image blur correction included in the angular speed signal from the angular speed sensor 34 is removed. The angular speed signal having passed this high-pass filter 50 is subsequently input in the phase compensator 52.

In the phase compensator 52, with respect to the angular speed signal input from the high-pass filter 50, the phase shift of each frequency component of the angular speed signal, which originates in the frequency characteristic of the angular speed sensor 34, is amended. The angular speed signal subjected to phase compensation by this phase compensator 52 is subsequently input in the integrator 54.

In the integrator 54, the angular speed signal input from the phase compensator 52 is integrated and the angular speed signal is converted into an angle signal. That is, the value corresponding to the level of displacement in the horizontal direction of the digital camera 10 is calculated as an angle signal. The angle signal calculated in the integrator 54 is input in the centripetal force generator 56.

In the centripetal force generator 56, to prevent the imaging element 14 driven and displaced by the blur correction mechanism 38 from reaching the end position of a movable range (range of movement) thereof and prevent image blur correction from not being appropriately performed, a centering signal corresponding to the centripetal force that returns the imaging element 14 to the center of the range of movement (correction center) that is the optical center (force is added to the correction center) is superimposed with the angle signal input from the integrator 54. By this means, the angle signal to which the centripetal force is added is generated, and the angle signal is input in the correction coefficient calculation unit 58. Also, specific processing content related to the generation of the angle signal to which the centripetal force is added is described later.

In the correction coefficient calculation unit 58, a correction coefficient of a predetermined value is multiplied by the angle signal input from the centripetal force generator 56, and the value on control processing indicating the position in the horizontal direction of the imaging element 14 to cancel an image blur with respect to the position change in the horizontal direction of the digital camera 10, which is found by the angle signal, is calculated. At this time, since it is necessary to displace the imaging element 14 greater as the focal length in the imaging lens 12 is longer, information on the focal length currently set in the imaging lens 12 is acquired from the CPU 30 and a correction coefficient of an appropriate value for the focal length is calculated. The angle signal multiplied by the correction coefficient calculated by this correction coefficient calculation unit 58, that is, a target position signal indicating the position in the horizontal direction of the imaging element 14 to cancel the image blur is output to the drive voltage calculation unit 60.

In the drive voltage calculation unit 60, a drive voltage applied to the actuator that displaces the imaging element 14 of the blur correction mechanism 38 in the horizontal direction is calculated on the basis of the target position signal input from the correction coefficient calculation unit 58, and the calculated drive voltage is output to the actuator. For example, the drive voltage calculation unit 60 performs feedback control, acquires a current position signal indicating the currently set position of the imaging element 14 in the horizontal direction from a position sensor of the blur correction mechanism 38, and calculates the drive voltage that drives the actuator such that the difference between the current position signal and the target position signal becomes 0.

By driving the actuator of the blur correction mechanism 38 by the drive voltage calculated and output by the drive voltage calculation unit 60 in this way, the imaging area of the imaging element 14 shifts in the horizontal direction so as to cancel an image blur due to the position change in the horizontal direction of the digital camera 10, and the image blur is suppressed. Also, the vertical-direction image blur correction with respect to the position change in the vertical direction of the digital camera 10 as described above is performed as well as the horizontal-direction image blur correction as described above.

Moreover, the pan/tilt detection unit 62 of the blur correction control unit 36 detects whether the position change in the horizontal or vertical direction of the digital camera 10 is caused by a panning operation or tilting operation of the digital camera 10 intended by a cameraman. For example, the angular speed signal before being output from the angular speed sensor 34 and input in the high-pass filter 50 is input in the pan/tilt detection unit 62, and it determines whether the angular speed signal is a signal form indicating the panning operation. Regarding whether it is the signal form indicating the panning operation, for example, it is set as a panning determination condition that the absolute value of the angular speed signal continues to exceed a predetermined value over a certain period of time, and it is determined whether this panning determination condition is satisfied. In a case where the panning determination condition is satisfied, since it shows that the position change of the digital camera 10 is continuously caused in one of the right and left directions, it is determined that the panning operation is performed. In a case where the panning determination condition is not satisfied, it is determined that the panning operation is not performed.

Moreover, the pan/tilt detection unit 62 also performs panning determination on the angle signal output from the centripetal force generator 56 by the panning determination condition similar to the panning determination based on the angular speed signal output from the angular speed sensor 34, and it is determined that the panning operation is performed in a case where the panning determination condition is satisfied in the panning determination based on one of the signals. Also, determination as to whether the tilting operation is performed is similarly performed on the basis of an angular speed signal of the angular speed sensor that detects the position change of the digital camera 10 in the vertical direction and an angle signal from the centripetal force generator 56.

Thus, in a case where the pan/tilt detection unit 62 detects that the panning operation or the tilting operation is performed, positional displacement of the digital camera 10 detected with the angular speed sensor 34 is not a blur such as camera shake, the blur correction control unit 36 stops the image blur correction. As for the stop of the image blur correction, for example, the value of the angular speed signal input from the angular speed sensor 34 is forcefully set to the zero value and the angle signal output from the integrator 54 is gradually attenuated to the zero point. By this means, a feeling of strangeness and a trouble caused by performing image blur correction when the photographer performs the panning operation or the tilting operation are overcome.

Next, a control mode related to the above-mentioned image blur correction (image blur correction mode) is described.

In the above-mentioned digital camera 10, as an imaging mode type to take an image, for example, there is a panoramic imaging mode to take a panoramic image or the like in addition to a still image imaging mode to take a still image of one frame by pressing a release button fully once.

At the time of the still image imaging mode, a normal correction mode (standard correction mode) is suitable as an image blur correction mode. The standard correction mode denotes a mode in which, for example, the image blur correction starts when the release button is pressed halfway, and the image blur correction of certain processing content is continuously performed by the time the imaging is finished by pressing the release button fully. Moreover, in this standard correction mode, determination processing of the panning operation and the tilting operation (pan/tilt operation) by the pan/tilt detection unit 62 and processing to stop the image blur correction at the time of the pan/tilt operation are effectively performed too.

Also, the start of the image blur correction is not limited to the time when the release button is pressed halfway, and it may be performed at the timing at which an imaging mode of any type is selected or the timing at which exposure is started by pressing the release button fully. Moreover, the timing of starting such image blur correction may be selected by the user in menu setting or the like.

Meanwhile, at the time of the panoramic imaging mode, the image blur correction by the standard correction mode is not suitable. In the panoramic imaging mode, when the photographer rotates the digital camera 10 (swing movement) in, for example, a direction designated in advance after pressing the release button fully, imaging (exposure) for one frame is performed every predetermined time while the swing movement is performed. Further, it denotes a mode in which the imaging is finished when imaging for the number of frames decided in advance is finished or when the photographer presses the release button fully again. Here, as control of the panoramic imaging mode, there is a form in which: imaging (exposure) for one frame is performed every predetermined rotation angle while the swing movement is performed; and the imaging is finished when the rotation angle of the digital camera 10 reaches a rotation angle defined in advance or the release button is pressed fully again, and detailed control content of the panoramic imaging mode is not limited to the specific one. A series of still images taken in the panoramic imaging mode are combined by processing in the digital camera 10 or software processing in an external device such as a personal computer to which they are transferred, and one panoramic image is generated.

In such a panoramic imaging mode, image blur (rotation blur) due to the swing movement during an exposure period is suppressed by performing image blur correction during the exposure period of the imaging element 14, and therefore it is effective because it is not necessary to make the digital camera 10 stand still every time exposure is performed. Meanwhile, when the image blur correction is performed in the standard correction mode, there is a trouble that the swing movement of the digital camera 10 is determined to be the pan/tilt operation and the image blur correction is stopped. Moreover, even in a case where the stop of the image blur correction at the time of the pan/tilt operation is invalidated (the detection processing in the pan/tilt detection unit 62 is invalidated), when image blur correction of the same processing content is performed without distinguishing between the exposure period and the non-exposure period like the standard correction mode, there is a trouble that the imaging element 14 reaches the end position in the range of movement and the image blur correction does not work effectively.

Therefore, the above-mentioned digital camera 10 has a swing correction mode as a suitable image blur correction mode at the time of the panoramic imaging mode or the like. In this swing correction mode, the stop of the image blur correction at the time of the pan/tilt operation is invalidated (the detection processing in the pan/tilt detection unit 62 is invalidated), and control is performed to return the imaging element 14 to the center of the range of movement (correction center) by performing the image blur correction only during an exposure period in which exposure is performed in the imaging element 14 and stopping the image blur correction in other periods than the exposure period (non-exposure period). By this means, the above-mentioned trouble is overcome.

Moreover, in the non-exposure period, as the speed of returning the imaging element 14 to the correction center becomes faster, the displacement amount to be able to return the imaging element 14 to the correction center in the non-exposure period becomes larger, and, since it is possible to shorten the non-exposure period, it is possible to shorten the imaging interval and take an image with a higher-speed swing movement. That is, although the displacement amount of the imaging element 14 in the exposure period becomes larger as the swing movement becomes faster in the case of taking an image every predetermined time during the swing movement, it is possible to take an image in the higher-speed swing movement if it is possible to increase the displacement amount to be able to return the imaging element 14 to the correction center in the non-exposure period by fastening the speed of returning the imaging element 14 to the correction center. Moreover, although the imaging interval becomes shorter and the non-exposure period becomes shorter as the swing movement is faster in the case of taking an image every predetermined rotation angle during the swing movement, it is possible to take an image in the higher-speed swing movement if it is possible to shorten the imaging interval to be able to return the imaging element 14 to the correction center in the non-exposure period by fastening the speed of returning the imaging element 14 to the correction center.

Therefore, in the swing correction mode, at the time of stopping the image blur correction in the non-exposure period, the centripetal force by the centripetal force generator 56 of the blur correction control unit 36 illustrated in FIG. 2 is switched to a larger centripetal force than in the exposure period. By this means, the imaging element 14 is promptly returned to the correction center and imaging in the higher-speed swing movement is enabled.

Here, one example of processing content in the centripetal force generator 56 of the blur correction control unit 36 in FIG. 2 is described. Also, similar to the above-mentioned explanation, only processing related to image blur correction in the horizontal direction is described. A current position signal indicating the current position in the horizontal direction (the displacement amount from the correction center) of the imaging element 14 from the position sensor included in the blur correction mechanism 38, is given to the centripetal force generator 56. The centripetal force generator 56 generates a centering signal with a higher absolute value as the displacement amount from the correction center indicated by the current position signal from the blur correction mechanism 38 becomes larger. Further, an angle signal decreasing the level of the angle signal input from the integrator 54 by the absolute value of the centering signal is generated. By this means, the angle signal to which the centripetal force is added is generated.

Figure 3:
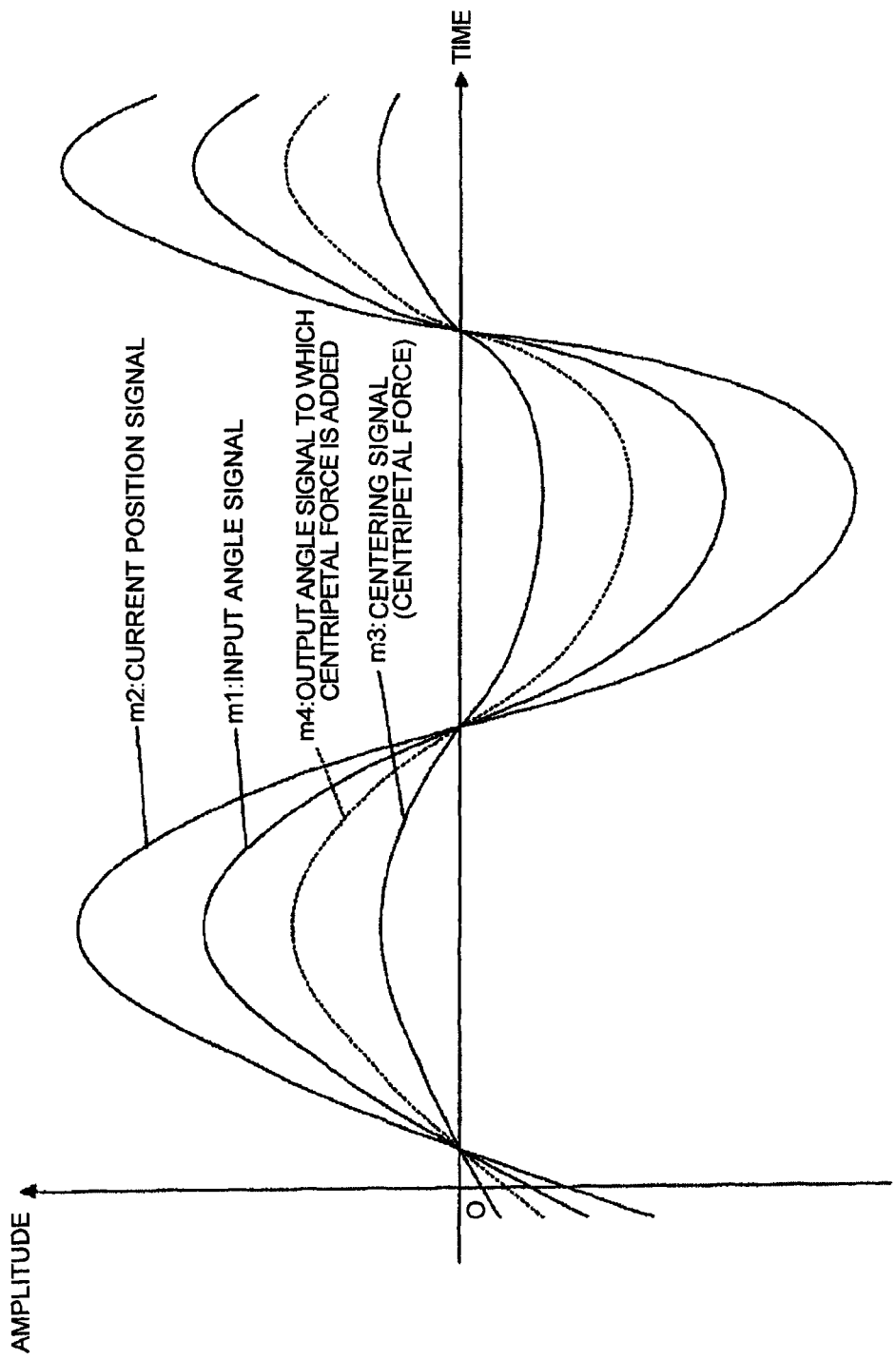
FIG. 3 is an explanatory drawing of centripetal force.

When a specific explanation is given using FIG. 3, the figure illustrates an angle signal (input angle signal m1) input from the integrator 54 to the centripetal force generator 56 and current position signal m2 of the imaging element 14 input from the blur correction mechanism 38 to the centripetal force generator 56, in a certain time range when image blur correction is performed. As illustrated in the figure, when it is assumed to perform control such that the positive and negative of input angle signal m1 and the positive and negative of current position signal m2 are matched, centering signal m3 with a larger value is generated as the value of current position signal m2 is larger.

That is, a case is exemplified in the figure where a signal calculated by multiplying current position signal m2 by a predetermined coefficient is assumed as centering signal m3, and, like this centering signal m3, the value of the centering signal is generated as the zero value when current position signal m2 is the zero value. When current position signal m2 has a positive value and the value (absolute value) is larger, centering signal m3 has a positive value and the value is generated as a large value (absolute value). When current position signal m2 has a negative value and the value (absolute value) is larger, centering signal m3 has a negative value and the value is generated as a larger value (absolute value).

Further, the centripetal force generator 56 generates angle signal (output angle signal) m4 to which the centripetal force is added, by subtracting centering signal m3 generated in this way from input angle signal m1, and outputs that output angle signal m4 to the correction coefficient calculation unit 58 on the subsequent stage.

Here, in a case where the positive and negative relationship between input angle signal m1 and current position signal m2 is opposite to FIG. 3, for example, by generating centering signal m3 whose positive and negative agree with current position signal m2 as illustrated in FIG. 3 and adding this centering signal m3 to input angle signal m1, an angle signal to which the centripetal force is added is generated. Moreover, the generation of the angle signal to which the centripetal force is added is not limited to the one by the above-described processing, and it may be possible to generate an angular signal that greatly attenuates an input angle signal as the displacement amount from the correction center of the imaging element 14 is larger in the case of superimposing a centering signal on the input angle signal by addition or subtraction.

The level of the centripetal force in such the centripetal force generator 56, that is, the level of centering signal m3 at the time of generating output angle signal m4 described above can be changed according to an instruction signal from the CPU 30. For example, in the case of generating centering signal m3 by multiplying current position signal m2 by a predetermined coefficient, it is possible to change the level of the centripetal force by changing the level of the coefficient to the level designated by the CPU 30.

Further, as the centripetal force becomes greater, an effect of the image blur correction is reduced but the operation that returns the imaging element 14 to the correction center becomes greater. Therefore, in the swing correction mode as described above, by setting the centripetal force of the centripetal force generator 56 in the non-exposure period of the imaging element 14 to a centripetal force greater than the centripetal force in the exposure period, it is possible to fasten the speed of returning the imaging element 14 to the correction center and return it in a shorter time. Here, although the centripetal force in the standard correction mode is set to a centripetal force level at which it is possible to appropriately prevent the imaging element 14 from reaching the end position in the range of movement and the correction operation from being restricted without reducing the effect of the image blur correction as much as possible, the centripetal force in the swing correction mode is set to at least a centripetal force greater than the centripetal force in the standard correction mode.

The swing correction mode as described above is not limited to the panoramic imaging mode, and it is effective to a case where the photographer wants to take an image without image blur (rotation blur) while performing a swing movement of the digital camera, in a continuous imaging (sequential imaging) mode to continuously take still images while the release button is pressed fully, or the like. Therefore, regardless of the type of a selected imaging mode, the photographer may be able to arbitrarily select the standard correction mode or the swing correction mode as an image blur correction mode, or an appropriate image blur correction mode may be automatically selected according to the selected imaging mode type. For example, the standard correction mode may be automatically selected when the still image imaging mode is selected and the swing correction mode may be automatically selected when the panoramic imaging mode is selected. Moreover, even in a case where the image blur correction mode is automatically selected, the photographer can arbitrarily switch it to a desired image blur correction mode after an optimal image blur correction mode is automatically selected.

Figure 4:
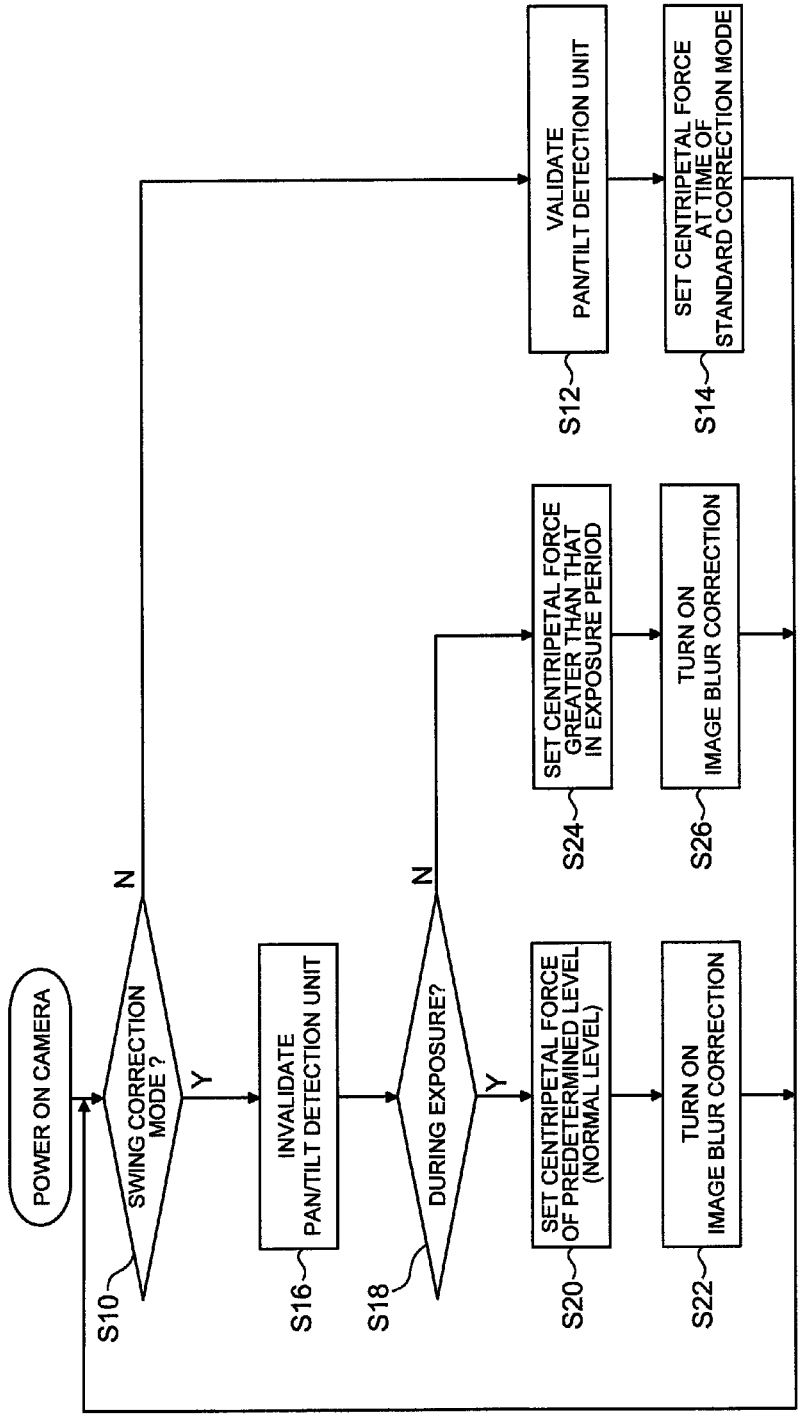
FIG. 4 is a flowchart illustrating a processing procedure of a CPU related to the switching between an operation condition and operation state of a blur correction control unit in a swing correction mode.

Next, the flowchart of FIG. 4 is used to describe the switching of the operation condition and operation state of the blur correction control unit 36 in the swing correction mode.

After the power of the digital camera 10 is turned on, the CPU 30 determines whether the image blur correction mode is set to the swing correction mode (step S10). In a case where the user selects the image blur correction mode as described above, whether the swing correction mode is set is determined by detecting the operation by the operation unit 32 in which the selection is performed. In a case where the image blur correction mode is automatically set to the swing correction mode for a specific kind of imaging mode such as the panoramic imaging mode, it is determined by detecting the operation of the operation unit 32 in which the imaging mode is selected. Here, in a case where it is not the swing correction mode, it is assumed that the standard correction mode is set, and a case is not considered where other kinds of modes (such as a mode in which the image blur correction is not performed) are not set.

In a case where "NO" is determined in step S10, that is, in a case where it is determined that the standard correction mode is set, the CPU 30 validates detection processing of the pan/tilt detection unit 62 in the blur correction control unit 36 and validates processing that stops the image blur correction at the time of pan/tilt operation (step S12). Moreover, the centripetal force (centering signal) in the centripetal force generator 56 is set to the level (normal level) decided in advance for the standard correction mode (step S14). Here, the level (normal level) of the centripetal force in the standard correction mode is assumed to be a level at which it is possible to keep an effect of the image blur correction excellent in the still image imaging mode and excellently prevent the imaging element 14 from reaching the end position in the range of movement and the correction operation from being restricted.

When the setting in above-mentioned steps S12 and S14 are finished, it returns to the determination processing in step S10. Although the processing in steps S10 to S14 is repeated while the standard correction mode is set, those items of processing are skipped in a case where the processing target is not changed in the processing in steps S12 and S14 (in the case of the second and subsequent processing when steps S10 to S14 are continuously repeated). Here, the blur correction control unit 36 actually starts the image blur correction in the standard correction mode when, for example, the CPU 30 detects the half press of the release button by a signal from the operation unit 32 and the CPU 30 instructs the blur correction control unit 36 (each component of the blur correction control unit 36) to start the image blur correction. When exposure in the imaging element 14 is finished after the release button is pressed fully, the CPU 30 instructs the blur correction control unit 36 to stop the image blur correction and the image blur correction by the blur correction control unit 36 is stopped.

In a case where "YES" in step S10 is determined, that is, in a case where it is determined that the swing correction mode is set, the detection processing of the pan/tilt detection unit 62 in the blur correction control unit 36 is invalidated and the processing that stops the image blur correction at the time of the pan/tilt operation is invalidated (step S16).

Next, it is determined whether the imaging element 14 is being exposed (step S18). For example, when the photographer presses the release button fully to start the swing movement of the digital camera 10 in a case where the panoramic imaging mode is set, an exposure period in which the exposure of the imaging element 14 is performed and a non-exposure period in which the exposure is not performed are repeated while the swing movement is performed. In step S14, whether it is the exposure period is determined.

In a case where "YES" is determined in step S18, the CPU 30 sets the centripetal force (centering signal) in the centripetal force generator 56 of the blur correction control unit 36 to a centripetal force of a predetermined level (step S20). That is, the centripetal force during the exposure period set here has a level at which it is possible to excellently suppress a rotation blur due to the swing movement and excellently prevent the imaging element 14 from reaching the end position in the range of movement and the correction operation from being restricted, for example, it is set to a level (normal level) equal to the centripetal force in the standard correction mode. However, the centripetal force in the exposure period in the swing correction mode can be set to a level unrelated to the centripetal force in the standard correction mode. Moreover, the imaging element 14 is returned to the correction center at the time of the start of exposure in the swing correction mode, and, since the displacement amount of the imaging element 14 to reach the end position is large, it is possible to reduce the centripetal force in the exposure period and further reduce it (including the case of 0) less than the centripetal force of a normal level in the standard correction mode.

When the centripetal force is set in step S20, the image blur correction by the blur correction control unit 36 is executed (step S22). By this means, an image blur due to the positional displacement of the digital camera 10 during the exposure period is suppressed. Moreover, an image blur (rotation blur) due to the swing movement of the digital camera 10 is suppressed in a case where the panoramic imaging mode is set.

It returns to step S10 after the processing in step S22. Subsequently, during exposure in a state where the swing correction mode is set, the processing in steps S10 and S16 to S22 is repeated. However, those items of processing are skipped in a case where the processing target is not changed in the processing in steps S16, S20 and S22 (in the case of the second and subsequent processing when the processing in steps S10 and S16 to S22 is continuously repeated).

On the other hand, in a case where "NO" is determined in step S18, the CPU 30 sets the centripetal force (centering signal) in the centripetal force generator 56 of the blur correction control unit 36 to a centripetal force greater than the centripetal force in the exposure period set in step S20 (step S24). By this means, the imaging element 14 can be promptly returned to the correction center when the image blur correction is stopped. Here, the centripetal force in this non-exposure period is greater than at least the level (normal level) in the standard correction mode.

When the centripetal force is set, the image blur correction by the blur correction control unit 36 is stopped (step S26). The stop of the image blur correction here does not assume the complete stop of the operation of the blur correction control unit 36 but assumes the continuation of processing with a presumption that an angular speed signal from the angular speed sensor 34 input in the image blur correction control unit 36 is the zero value, and it indicates processing that returns the imaging element 14 to the correction center by the operation of the centripetal force of the centripetal force generator 56.

It returns to step S10 after the processing in step S26. Subsequently, the processing in steps S10, S16, S18, S24 and S26 is repeated when it is not during the exposure (in the case of the non-exposure period) in a state where the swing correction mode is set. However, those items of processing are skipped in a case where the processing target is not changed in the processing in steps S16, S24 and S26 (in the case of the second and subsequent processing when the processing in steps S10, S16, S18, S24 and S26 is continuously repeated).

Figure 5:
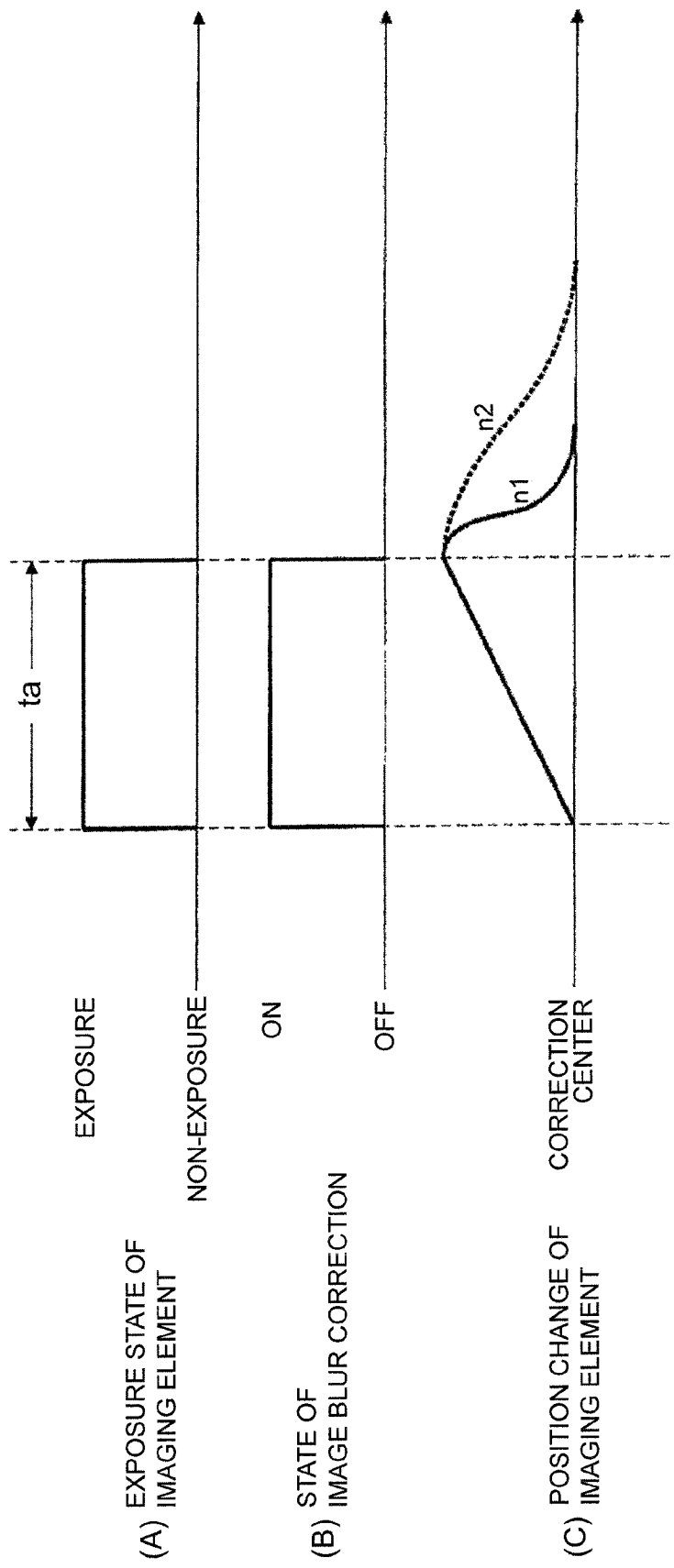
FIG. 5 is a view illustrating the relationships between the exposure state of an imaging element during the swing movement of a camera, the ON/OFF state of image blur correction and the displacement amount of the imaging element.

According to the above-mentioned processing, for example, when the imaging element 14 is being exposed (exposure period ta) like part (A) of FIG. 5 during the swing movement of the digital camera 10 in the panoramic imaging mode, the image blur correction by the blur correction control unit 36 is performed like part (B) of the figure. The centripetal force in the centripetal force generator 56 at this time is set to the centripetal force of the normal level as well as the standard correction mode. Further, like part (C) of the figure, the imaging element 14 is displaced at the speed corresponding to the speed of the swing movement as shown in part (C) of the figure so as to suppress an image blur due to the position change of the digital camera 10 by the swing movement.

Meanwhile, when the exposure of the imaging element 14 is finished like part (A) of the figure and it is switched to the non-exposure period, the image blur correction is stopped like part (B) of the figure. Subsequently, the centripetal force in the centripetal force generator 56 is switched to a centripetal force greater than at least the normal level of centripetal force. By this means, the imaging element 14 is moved to the correction center according to the trajectory as illustrated by curve n1 like part (C) of the figure. If the centripetal force in the centripetal force generator 56 is assumed as the centripetal force of the normal level, since the imaging element 14 is moved to the correction center according to the trajectory as illustrated by curve n2 (broken line) in part (C) of the figure, the time to return to the correction center becomes long. At this time, if the swing movement is performed at high speed in the panoramic imaging mode or the like and the displacement amount of the imaging element 14 becomes large in the exposure period or the non-exposure period becomes short, in the case of the centripetal force of the normal level, the imaging element 14 cannot start the correction operation from the correction center when the next exposure starts. If this is repeated, there is fear that the correction operation is restricted in the end position of the range of movement and the rotation blur is not appropriately suppressed.

By contrast with this, like the present embodiment, when the imaging element 14 is promptly returned to the correction center by enlarging the centripetal force during the non-exposure period, the above-mentioned troubles are avoided and it is possible to take an image in the high-speed swing movement in the panoramic imaging mode or the like.

Moreover, normally, since the optical system of the imaging lens 12 is designed so as to acquire the best image quality in a state where the imaging element 14 is set to the correction center, it is possible to acquire the best image quality by returning the imaging element 14 to the correction center in the non-exposure period like the above-mentioned form and activating the imaging element 14 from the correction center when the exposure is started.

Here, in the above-mentioned form, although the image blur correction is stopped in the non-exposure period, it is possible to suppress the displacement operation of the imaging element 14 for image blur correction by the centripetal force and promptly return the imaging element 14 to the correction center by setting the centripetal force in the non-exposure period to an extremely great centripetal force while performing the image blur correction as well as the exposure period.

Figure 6:
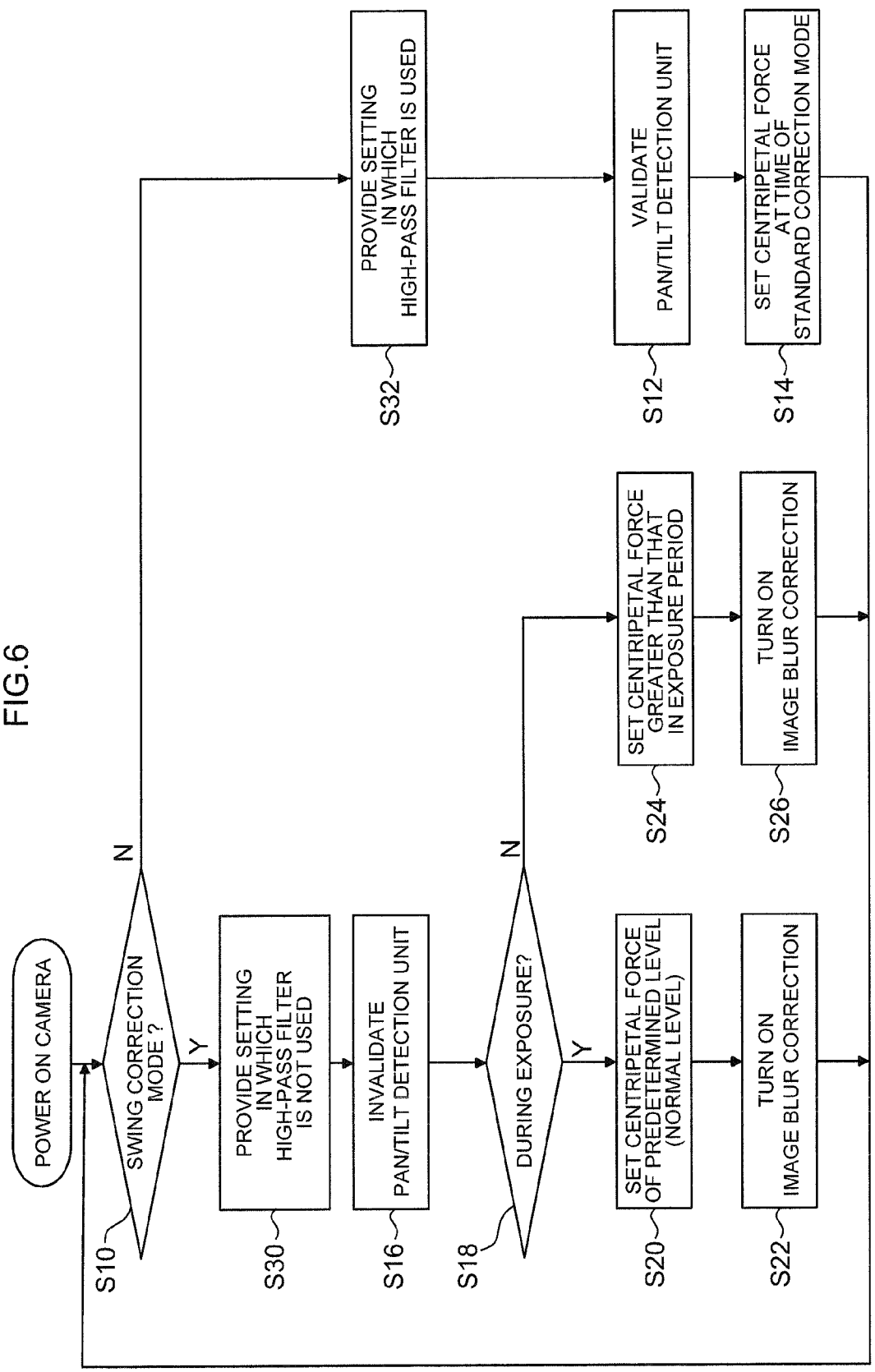
FIG. 6 is a flowchart illustrating processing content of a first application example to which a configuration of the swing correction mode described in FIG. 4 is applied.

Next, the first application example that applies the form of the swing correction mode described in FIG. 4 is described in the flowchart of FIG. 6. Here, the same step numbers are assigned to the steps of the same processing as in the flowchart of FIG. 4 and their explanation is omitted.

As different processing from the flowchart of FIG. 4 in the flowchart of FIG. 6, the processing in steps S30 and S32 is added. The processing in step S30 denotes processing to switch to the setting in which the high-pass filter 50 of the blur correction control unit 36 illustrated in FIG. 2 is not used (the setting in which the high-pass filter 50 is invalidated) in a case where it is determined in step S10 that the image blur correction mode is set to the swing correction mode. Moreover, it denotes processing to switch to the setting in which the high-pass filter 50 is used (the setting in which the high-pass filter 50 is validated) in a case where it is determined in step S10 that the image blur correction mode is set to the standard correction mode.

Figure 7:
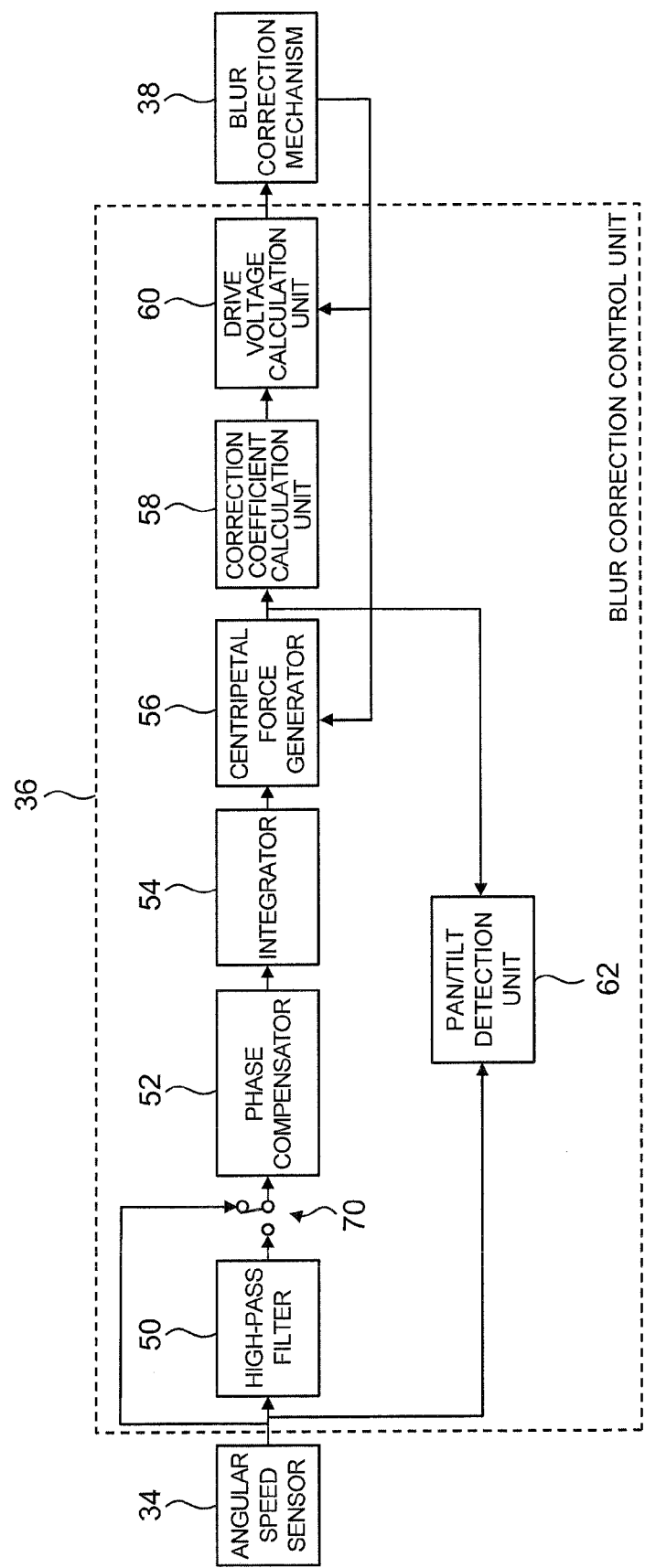
FIG. 7 is a block diagram illustrating a structure of an image blur correction mechanism in the first application example.

The configuration of the blur correction control unit 36 at this time is as illustrated in FIG. 7. In FIG. 7, the same reference numerals are assigned to the same components as FIG. 2 and their explanation is omitted, and a switch 70 is provided between the high-pass filter 50 and the phase compensator 52 in FIG. 7. The switch 70 switches between a state where an angular speed signal passing through the high-pass filter 50 is input in the phase compensator 52 and a state where an angular speed signal before being output from the angular speed sensor 34 and input in the high-pass filter 50 is input in the phase compensator 52. The CPU 30 performs the processing in steps S30 and S32 by switching the state of the switch 70. In step S30, the switch 70 is set to the state where the angular speed signal before being output from the angular speed sensor 34 and input in the high-pass filter 50 is input in the phase compensator 52, and it is set not to use the high-pass filter 50. Meanwhile, in step S32, the switch 70 is set to the state where the angular speed signal output from the high-pass filter 50 is input in the phase compensator 52, and it is set to use the high-pass filter 50.

Figure 8:
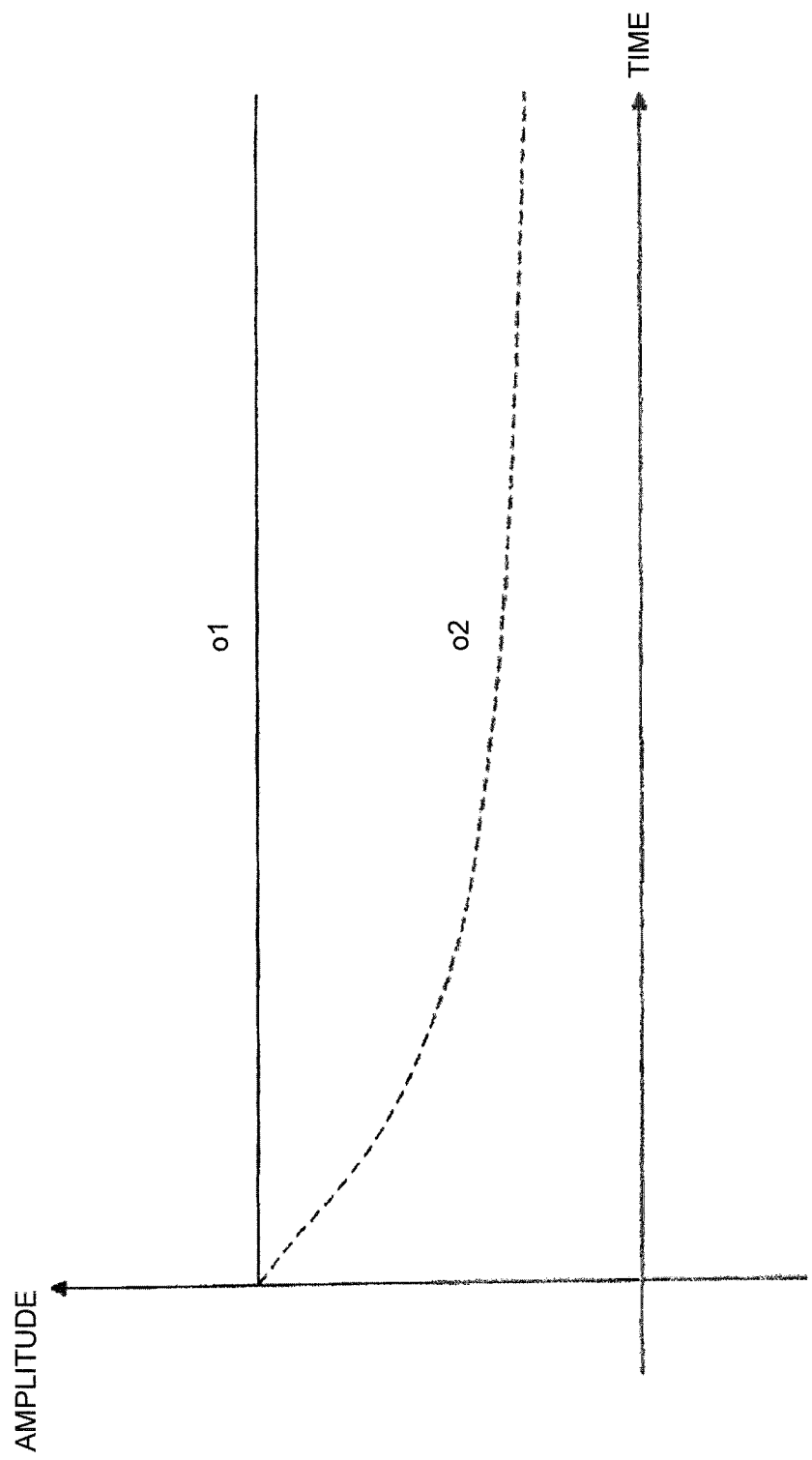
FIG. 8 is an explanatory drawing used to describe an effect in the first application example.

According to this, for example, it is possible to suppress an image blur (rotation blur) during the exposure period due to the swing movement of the digital camera 10 in the panoramic imaging mode more suitably. That is, while the swing movement of the digital camera 10 is performed, an angular speed signal of a substantially constant value as illustrated by curve o1 in FIG. 8 is output from the angular speed sensor 34. When such an angular speed signal is input in the high-pass filter 50 and the low frequency component is removed, it becomes a signal that gradually attenuates over time as illustrated by curve o2 in the figure. Therefore, when the image blur correction is performed as above on the basis of the angular speed signal having passed through the high-pass filter 50, there is fear that it is not possible to appropriately suppress the image blur due to the swing movement. Especially, appropriate suppression of the image blur does not continue as the exposure period becomes longer.

Meanwhile, at the time of the swing correction mode like step S30, by setting the high-pass filter 50 not to be used and inputting the angular speed signal which is illustrated by curve of in FIG. 8 and output from the angular speed sensor 34 in the phase compensator 52 as it is, it is possible to appropriately suppress the image blur due to the swing movement and continue appropriate suppression of the image blur even in a case where the exposure period is long.

Therefore, the swing correction mode in which the high-pass filter 50 is not used like this first application example is more suitable as an image blur correction mode in a case where an image is taken while performing the swing movement of the digital camera 10 like the panoramic imaging mode and an image blur due to the swing movement is suppressed.

Figure 9:
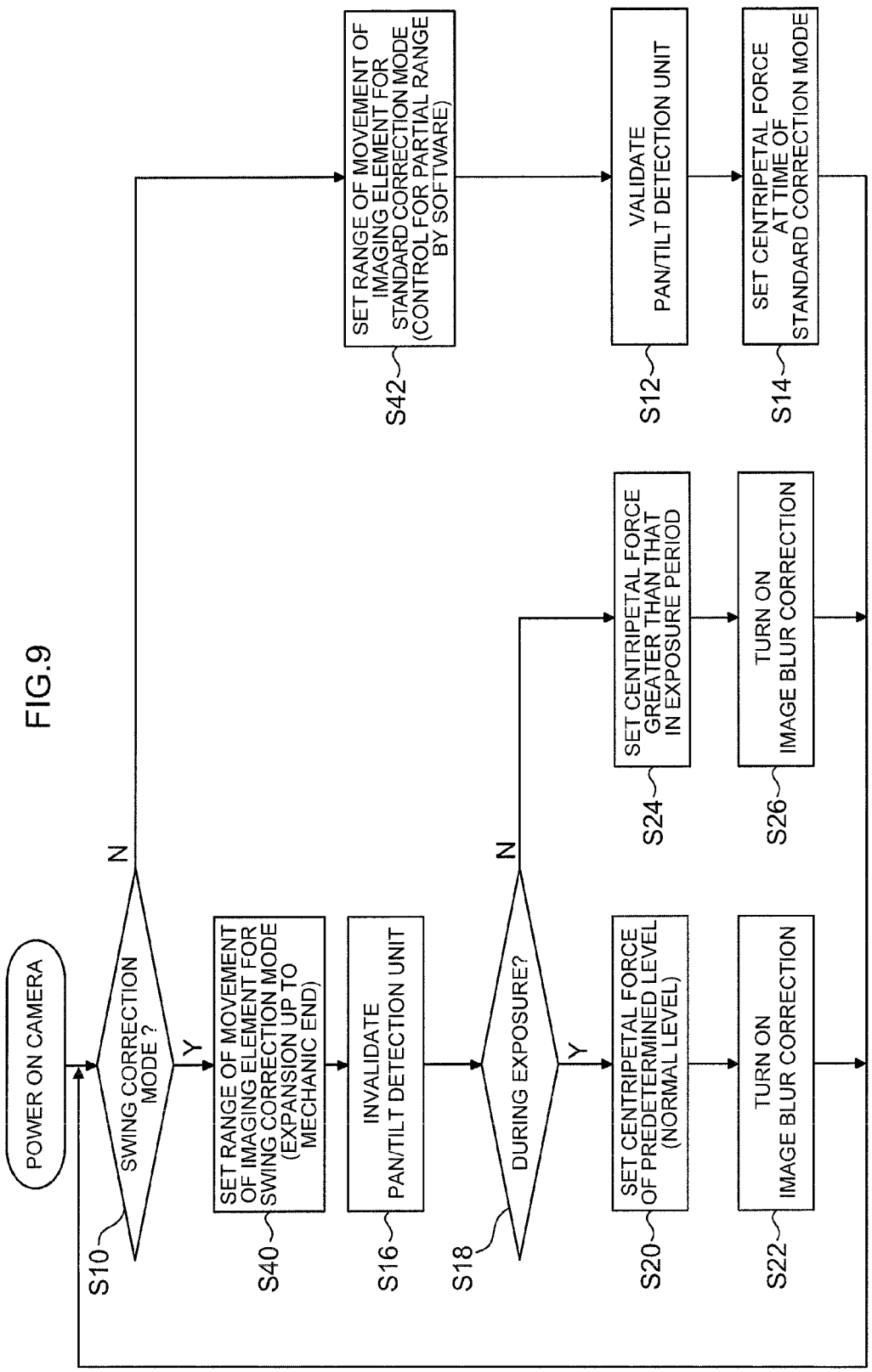
FIG. 9 is a flowchart illustrating processing content of a second application example to which a configuration of the swing correction mode described in FIG. 4 is applied.

Next, a second application example that applies the form of the swing correction mode described in FIG. 4 is described in the flowchart of FIG. 9. Here, the same step numbers are assigned to the steps of the same processing as in the flowchart of FIG. 4 and their explanation is omitted.

As different processing from the flowchart of FIG. 4 in the flowchart of FIG. 9, the processing in steps S40 and S42 is added. The processing in step S40 denotes processing to set the range of movement in which the imaging element 14 can move, to a range greater than the range of movement in the standard correction mode in a case where it is determined in step S10 that the image blur correction mode is set to the swing correction mode. Moreover, it denotes processing to set the range of movement of the imaging element 14 to the range of movement in the standard correction mode in a case where it is determined in step S10 that the image blur correction mode is set to the standard correction mode.

As for the range of movement of the imaging element 14, there are a range of movement restricted by a mechanic end position (the greatest range of movement) and a range of movement by control on processing to maintain excellent optical performance, and the latter range of movement is narrower than the former range of movement. It is limited to the latter range of movement in the standard correction mode. As for the control of the range of movement, for example, in the correction coefficient calculation unit 58 that generates and outputs a target position signal finally indicating the target position of the imaging element 14, it is realized by changing the value of the target position signal to a value (upper limit value or lower limit value) within an allowable range (a value range corresponding to the range of movement) set in advance in a case where the value of the target position signal is not a value in the allowable range, that is, in a case where it is greater than the upper limit value of the allowable range corresponding to one end position of the range of movement or it is less than the lower limit value of the allowable range corresponding to the other end position of the range of movement.

Therefore, the CPU 30 performs the processing in steps S40 and S42 by changing the allowable range of the value of the target position signal in the correction coefficient calculation unit 58. In step S40, the allowable range of the value of the target position signal in the correction coefficient calculation unit 58 is set a range (the range of movement for the swing correction mode) larger than a normal allowable range. For example, it is possible to set the maximum range of movement by mechanic control or a range close thereto as the range of movement for the swing correction mode. Meanwhile, in step S42, the allowable range of the value of the target position signal in the correction coefficient calculation unit 58 is set to a normal allowable range (the range of movement for the standard correction mode) and the range of movement of the imaging element 14 is set to a range in which it is possible to maintain excellent optical performance.

Figure 10:
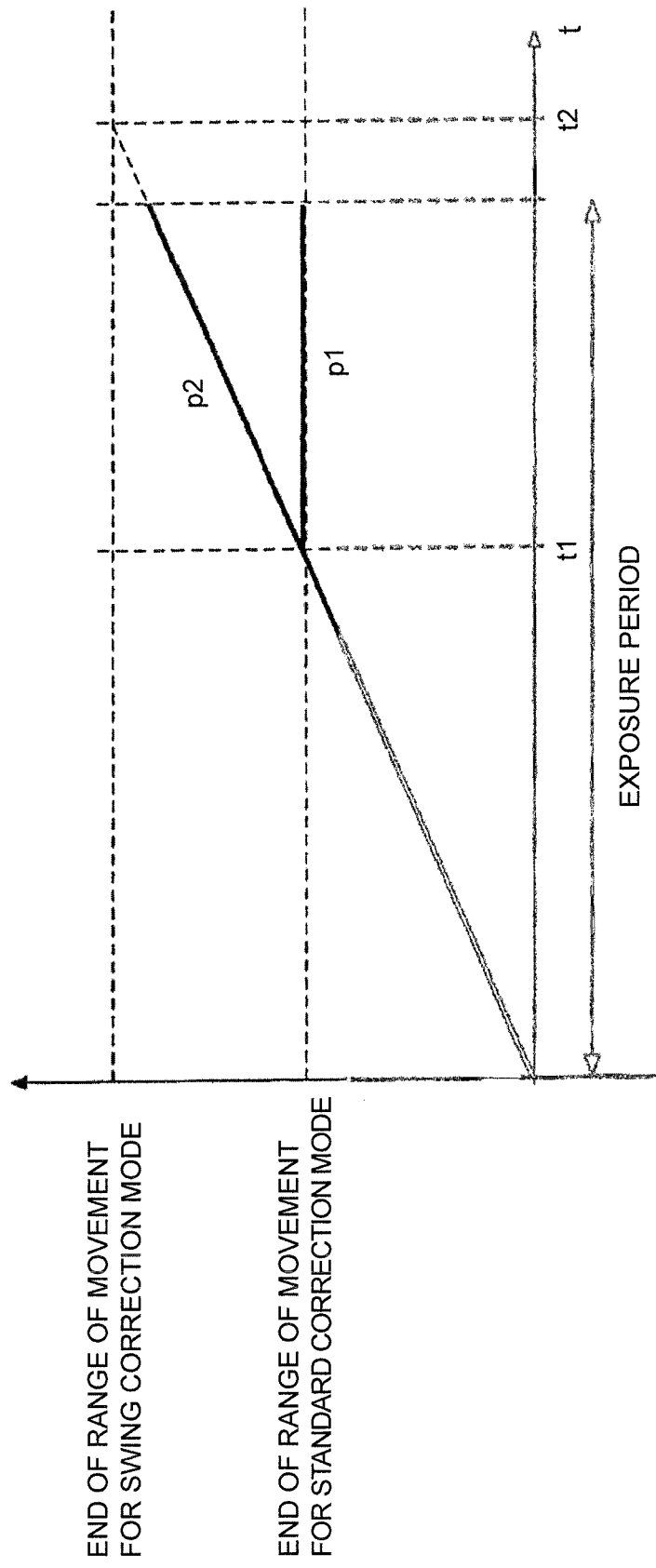
FIG. 10 is an explanatory drawing used to describe an effect in the second application example.

According to this, for example, image blur correction during the exposure period is appropriately performed even in the case of performing the swing movement of the digital camera 10 at high speed in the panoramic imaging mode. That is, as the swing movement is performed at higher speed, the displacement amount of the imaging element 14 to appropriately perform image blur correction in the exposure time of the imaging element 14 increases. Therefore, when the range of movement of the imaging element 14 is set to the normal range of movement (the range of movement for the standard correction mode), as illustrated by trajectory p1 of the displacement amount in the exposure period of the imaging element 14 in FIG. 10, there is a possibility that the imaging element 14 reaches the end position in the range of movement in the middle (time t1) of the exposure period, correction operation is subsequently limited and an image blur is caused. Meanwhile, by the processing in step S40, by expanding the range of movement of the imaging element 14 (the range of movement for the swing correction mode) at the time of the swing correction mode, as illustrated by trajectory p2 of the displacement amount in the exposure period of the imaging element 14 in FIG. 10, the imaging element 14 does not reach the end position in the range of movement in the middle of the exposure period and the image blur correction is appropriately performed.

Here, when the range of movement of the imaging element 14 is set to the range of movement for the standard correction mode in the case of performing the swing movement at the speed at which the displacement amount of the imaging element 14 is trajectory p2, the exposure time is limited to the time from the exposure start to time t1. Meanwhile, when the range of movement of the imaging element 14 is expanded to the range of movement for the swing correction mode, it is possible to lengthen the exposure time up to time t2 at which trajectory p2 of the displacement amount reaches the end position in the range of movement for the swing correction mode. Therefore, it can be said that the second application example can lengthen the exposure time.

As described above, not only one of the above-mentioned first application example and second application example but also both of them can be adopted at the same time.

Also, although an image blur due to the position change of the digital camera 10 is cancelled by displacing the imaging element 14 (imaging area) by the blur correction mechanism 38 in the above-mentioned embodiment, the kind of correction operation unit is not limited to the specific one as long as it is possible to change the relative position between the imaging area of the imaging element 14 and the subject image formed by the imaging lens 12 by displacing the correction operation unit that can be displaced within a predetermined range of movement instead of displacing the imaging element 14 as the correction operation unit. For example, as the correction operation unit, there is known a correction lens that is inserted and installed in the optical system of the imaging lens 12 and supported so as to be able to be displaced in a direction orthogonal to the optical axis. According to this, it is possible to change the relative position between the subject image and the imaging area by displacing the correction lens in the direction orthogonal to the optical axis by the blur correction mechanism 38, and it is possible to suppress an image blur by displacing the correction lens so as to cancel the image blur.

What is claimed is:

1. An imaging device comprising:
   an imaging device including an imaging element and an optical system that forms a subject image on an imaging area of the imaging element;
   a blur detection unit for outputting a blur signal indicating a change in a position or posture by movement of the imaging device;
   a correction operation unit for changing a relative position between the imaging area and the subject image in a direction orthogonal to an optical axis of the optical system by operating within a predetermined range of movement;
   a blur correction position calculation unit for calculating a position of the correction operation unit to cancel an image blur of the subject image based on the blur signal output from the blur detection unit, as a blur correction position;
   a driving unit for driving the correction operation unit based on the blur correction position calculated by the blur correction position calculation unit;
   a centripetal force addition unit for adding a centripetal force that returns the correction operation unit to a center of the range of movement; and
   a swing correction mode execution unit for executing image blur correction control of a swing correction mode that suppresses an image blur due to the change in the position or posture by the movement of the imaging device by driving the correction operation unit by the driving unit in a state where the centripetal force addition unit adds a centripetal force of a predetermined level to the correction operation unit in an exposure period in which the imaging element is exposed, and returns the correction operation unit to the center of the range of movement by adding a centripetal force greater than the centripetal force in the exposure period to the correction operation unit by the centripetal force addition unit in a non-exposure period in which the imaging element is not exposed.

2. The imaging device according to claim 1, wherein the centripetal force addition unit adds the centripetal force to the correction operation unit by using a position in which a displacement amount by the centripetal force is subtracted from the blur correction position calculated by the blur correction position calculation unit, as a position of the correction operation unit driven by the driving unit.

3. The imaging device according to claim 1, wherein the swing correction mode execution unit causes the blur correction position calculation unit to calculate the blur correction position with the blur signal output from the blur detection unit set as a zero value in the non-exposure period.

4. The imaging device according to claim 2, wherein the swing correction mode execution unit causes the blur correction position calculation unit to calculate the blur correction position with the blur signal output from the blur detection unit set as a zero value in the non-exposure period.

5. The imaging device according to claim 1, further comprising:
   a standard correction mode execution unit for executing image blur correction control of a standard correction mode that suppresses an image blur due to the change in the position or posture by the movement of the imaging device by driving the correction operation unit by the driving unit in a state where the centripetal force addition unit adds a centripetal force of a predetermined level to the correction operation unit regardless of the exposure period or the non-exposure period; and
   an image blur correction control switching unit for switching image blur correction control to be executed, between the image blur correction control of the standard correction mode by the standard correction mode execution unit and the image blur correction control of the swing correction mode by the swing correction mode execution unit.

6. The imaging device according to claim 2, further comprising:
   a standard correction mode execution unit for executing image blur correction control of a standard correction mode that suppresses an image blur due to the change in the position or posture by the movement of the imaging device by driving the correction operation unit by the driving unit in a state where the centripetal force addition unit adds a centripetal force of a predetermined level to the correction operation unit regardless of the exposure period or the non-exposure period; and
   an image blur correction control switching unit for switching image blur correction control to be executed, between the image blur correction control of the standard correction mode by the standard correction mode execution unit and the image blur correction control of the swing correction mode by the swing correction mode execution unit.

7. The imaging device according to claim 3, further comprising:
   a standard correction mode execution unit for executing image blur correction control of a standard correction mode that suppresses an image blur due to the change in the position or posture by the movement of the imaging device by driving the correction operation unit by the driving unit in a state where the centripetal force addition unit adds a centripetal force of a predetermined level to the correction operation unit regardless of the exposure period or the non-exposure period; and
   an image blur correction control switching unit for switching image blur correction control to be executed, between the image blur correction control of the standard correction mode by the standard correction mode execution unit and the image blur correction control of the swing correction mode by the swing correction mode execution unit.

8. The imaging device according to claim 4, further comprising:
a standard correction mode execution unit for executing image blur correction control of a standard correction mode that suppresses an image blur due to the change in the position or posture by the movement of the imaging device by driving the correction operation unit by the driving unit in a state where the centripetal force addition unit adds a centripetal force of a predetermined level to the correction operation unit regardless of the exposure period or the non-exposure period; and
an image blur correction control switching unit for switching image blur correction control to be executed, between the image blur correction control of the standard correction mode by the standard correction mode execution unit and the image blur correction control of the swing correction mode by the swing correction mode execution unit.

9. The imaging device according to claim 5, wherein in the non-exposure period, the swing correction mode execution unit sets the centripetal force added to the correction operation unit by the centripetal force addition unit to a centripetal force greater than at least the centripetal force in the standard correction mode.

10. The imaging device according to claim 6, wherein in the non-exposure period, the swing correction mode execution unit sets the centripetal force added to the correction operation unit by the centripetal force addition unit to a centripetal force greater than at least the centripetal force in the standard correction mode.

11. The imaging device according to claim 7, wherein in the non-exposure period, the swing correction mode execution unit sets the centripetal force added to the correction operation unit by the centripetal force addition unit to a centripetal force greater than at least the centripetal force in the standard correction mode.

12. The imaging device according to claim 8, wherein in the non-exposure period, the swing correction mode execution unit sets the centripetal force added to the correction operation unit by the centripetal force addition unit to a centripetal force greater than at least the centripetal force in the standard correction mode.

13. The imaging device according to claim 5, wherein:
the imaging device has a normal still image imaging mode to take a still image of one frame and a panoramic imaging mode to take still images of multiple frames continuously while performing a swing movement of the imaging device;
when the still image imaging mode is selected, the image blur correction control switching unit sets image blur correction control to be executed to the image blur correction control of the standard correction mode by the standard correction mode execution unit; and
when the panoramic imaging mode is selected, the image blur correction control to be executed is set to the image blur correction control of the swing correction mode by the swing correction mode execution unit.

14. The imaging device according to claim 5, further comprising a correction mode selection unit for selecting the standard correction mode and the swing correction mode by the user, wherein:
when the standard correction mode is selected by the correction mode selection unit, the image blur correction control switching unit sets image blur correction control to be executed to the image blur correction control of the standard correction mode by the standard correction mode execution unit; and
when the swing correction mode is selected by the correction mode selection unit, the image blur correction control to be executed is set to the image blur correction control of the swing correction mode by the swing correction mode execution unit.

15. The imaging device according to claim 5, further comprising a pan/tilt detection unit for detecting whether the imaging device performs a panning operation or the imaging device performs a tilting operation,
wherein, when the pan/tilt detection unit detects that the imaging device performs the panning operation or the tilting operation, the standard correction mode execution unit stops the image blur correction control of the standard correction mode and the swing correction mode execution unit invalidates detection by the pan/tilt detection unit.

16. The imaging device according to claim 5, wherein:
the blur detection unit includes a high-pass filter to pass signal of frequency component on the side of higher frequency than a predetermined cutoff frequency in a blur signal output from a sensor; and
at a time of the image blur correction control of the standard correction mode by the standard correction mode execution unit, the image blur correction control switching unit validly uses the high-pass filter, and, at a time of the image blur correction control of the swing correction mode by the swing correction mode execution unit, the image blur correction control switching unit invalidates the high-pass filter.

17. The imaging device according to claim 5, wherein:
at a time of the image blur correction control of the standard correction mode by the standard correction mode execution unit, the image blur correction control switching unit sets the range of movement of the correction operation unit to a normal range narrower than a maximum range of movement restricted by a mechanical end position; and
at a time of the image blur correction control of the swing correction mode by the swing correction mode execution unit, the range of movement of the correction operation unit is set to an expansion range larger than the normal range.

18. The imaging device according to claim 17, wherein the expansion range is the maximum range of movement.

19. The imaging device according to claim 1, wherein, when an exposure period of the imaging element next to the non-exposure period is started, the correction operation unit starts an operation from the center of the range of movement.

20. An imaging method in which an imaging device including an imaging element, an optical system that forms a subject image on an imaging area of the imaging element and a correction operation unit, executes:
a step of outputting a blur signal indicating a change in a position or posture by movement of the imaging device;
a step of changing a relative position between the imaging area and the subject image in a direction orthogonal to an optical axis of the optical system by operating the correction operation unit within a predetermined range of movement;
a step of calculating a position of the correction operation unit to cancel an image blur of the subject image based on the output blur signal, as a blur correction position;
a step of driving the correction operation unit based on the calculated blur correction position;
a step of adding a centripetal force that returns the correction operation unit to a center of the range of movement; and a step of executing image blur correction control of a swing correction mode that suppresses an image blur due to the change in the position or posture by the movement of the imaging device by driving the correction operation unit in a state where the centripetal force of a predetermined level is added to the correction operation unit in an exposure period in which the imaging element is exposed, and returns the correction operation unit to the center of the range of movement by adding a centripetal force greater than the centripetal force in the exposure period to the correction operation unit in a non-exposure period in which the imaging element is not exposed.

* * * * *